United States Patent [19]
Rist

[11] 3,855,790
[45] Dec. 24, 1974

[54] DEVICE FOR DRIVING TWO PARTS IN ROTATION

[75] Inventor: Michel Rist, Boulogne/S/Seine, France

[73] Assignee: Societe Anonyme Francaise Du Ferodo, Paris, France

[22] Filed: June 15, 1973

[21] Appl. No.: 370,234

[30] Foreign Application Priority Data
June 20, 1972  France .............................. 72.22124

[52] U.S. Cl. .................................... 60/361, 60/362
[51] Int. Cl. ............................................ F16h 41/04
[58] Field of Search .............. 60/345, 358, 361, 362

[56] References Cited
UNITED STATES PATENTS

| | | | |
|---|---|---|---|
| 2,910,832 | 11/1959 | Kelley | 60/362 |
| 3,016,709 | 1/1962 | Lysholm | 60/361 |
| 3,149,467 | 9/1964 | Knowles | 60/362 X |

Primary Examiner—Edgar W. Geoghegan
Attorney, Agent, or Firm—Young & Thompson

[57] ABSTRACT

The invention relates to a device for driving two members in rotation, one with respect to the other, in which a first of said members comprises a sleeve having at least one projecting tenon extending substantially in the prolongation of the wall of said sleeve and adapted to co-operate with the second said member, said device being constituted by a member distinct from said sleeve and rigidly fixed thereon by engagement means comprising on the one hand at least one recess formed in said sleeve, said tenon being inserted in said recess, bearing surfaces applied against each other for the purpose of retaining said tenon axially and tangentially, and on the other hand a ring concentric with said sleeve and engaged in contact both with said sleeve and said tenon for the radial retention of said tenon.

A principal application of the invention is to hydro-kinetic torque converters in which the sleeve is fixed to the impeller wheel and the tenons are engaged in the slots of a rotor of an oil circulation pump.

10 Claims, 7 Drawing Figures

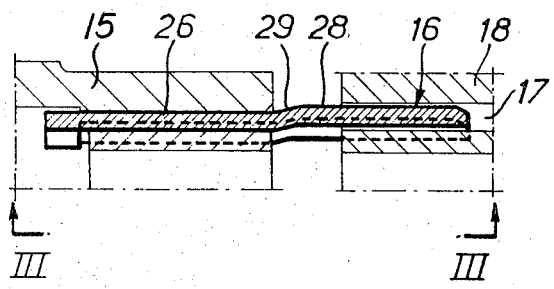
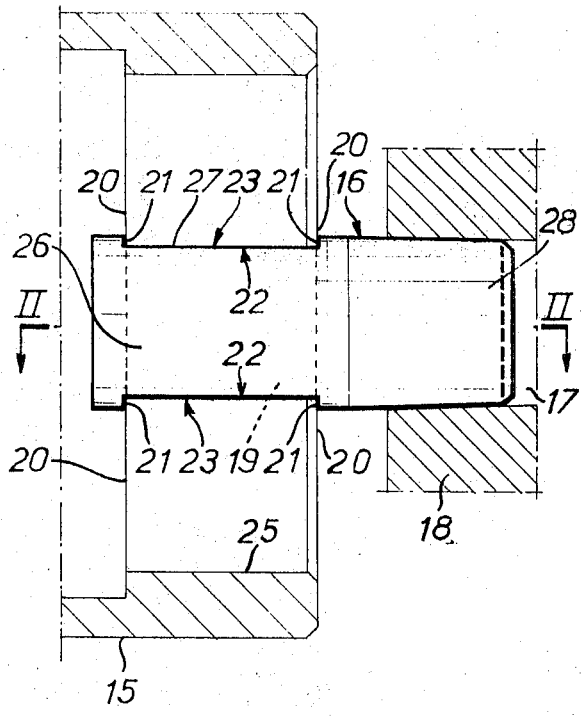
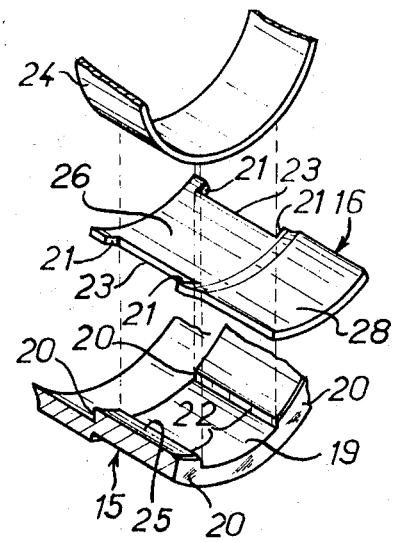

DEVICE FOR DRIVING TWO PARTS IN ROTATION

The present invention relates to a device for driving two parts in rotation with respect to each other, in which a first of these parts comprises a sleeve having at least one projecting tenon extending substantially in the extension of the wall of the sleeve and adapted to cooperate with the second part.

In these devices, the projecting tenon or tenons are generally made in a single piece with the sleeve. To this end, the sleeve is provided with an excess length, from which the tenons are cut-out. This manufacture necessitates recourse to machining which is difficult and expensive and which must be completed by a burr-removing operation which is itself also difficult due to the presence of the sleeve. Furthermore, if one of the tenons is damaged, it is necessary to replace the whole of the sleeve.

The present invention has for its object a driving device of the kind referred to above, the construction of which is less expensive and is very robust.

According to the invention, this device is characterized in that the tenon is constituted as a member separate from the sleeve and fixed rigidly on this latter by jointing means comprising, on the one hand at least one recess which is formed in the sleeve and in which the tenon is inserted with application of bearing surfaces in order to retain the tenon axially and tangentially, and on the other hand a ring concentric with the sleeve and engaged in contact both with the sleeve and the tenon, in order to retain the tenon radially.

By virtue of this arrangement, each tenon has greater strength, especially with respect to the tangential forces to which it is subjected, than when it is made of a single piece with the sleeve.

In particular, the tenon is not liable to be either twisted or torn in such a tangential direction. The tenon may furthermore be made of a material different from that of the sleeve, for example of a harder and stronger material. The manufacture is simpler and less expensive, since the sleeve is easier to produce while the tenons may be manufactured by mass production with a low cost price, in view of their small sizes. The finishing of the tenons, for example by dressing or burr-removal, can be conveniently carried out. If, for any particular reason, a tenon becomes damaged, it is very easy to replace it without it being necessary to replace the whole sleeve.

Each tenon may be provided either on the outside or the inside of the sleeve. In the second case, the radial retention ring is provided inside the sleeve and in the first case outside the sleeve.

In a preferred form of construction, each tenon and the ring are arranged on the inside of the sleeve.

According to another characteristic feature, the radial retention ring is utilized to form at the same time a bearing sleeve for the rotatable mounting of the sleeve with respect to a coaxial support.

Various forms of construction may be provided for the insertion of each tenon in a recess of the sleeve. In a preferred form of construction, the root of the tenon comprises a portion of smaller width engaged in a groove parallel to the axis of an annular boss on the sleeve, the said portion being limited by shoulders which are applied on both sides of this boss, while in an alternative form, the root of the tenon has a cruciform shape intended to be engaged in a groove parallel to the axis and in an annular groove in the sleeve.

The device according to the invention may receive various applications, and in particular an application to hydro-kinetic torque converters in which the sleeve is rigidly fixed to the impeller wheel and has tenons which are engaged in the slots of a rotor of an oil circulation pump.

Forms of embodiment of the invention are described below by way of example, reference being made to the accompanying drawings, in which:

FIG. 2 shows to a larger scale the assembly of one of the tenons of this device in cross-section, taken along the line II—II of FIG. 3;

FIG. 3 is a corresponding view in the direction of the arrows III—III of FIG. 2, certain parts being removed for clearness of the drawing;

FIG. 4 is a partial exploded view in perspective, illustrating the insertion of a tenon into a recess of the sleeve and its retention by the ring;

Figure 1:
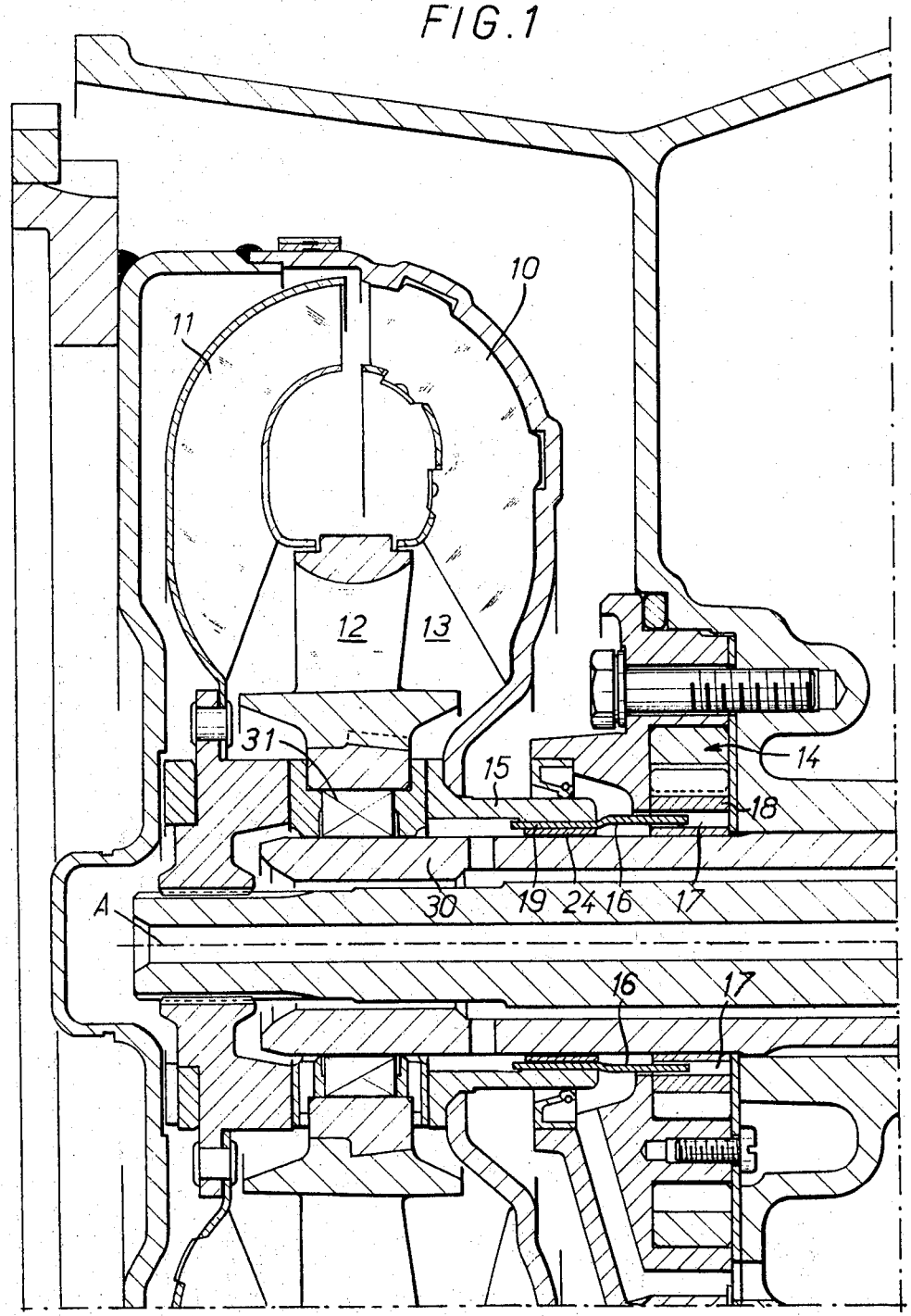
FIG. 1 is a partial view in longitudinal section of a hydro-kinetic torque converter comprising a device according to the invention.

Reference will first be made to FIGS. 1 to 4 which are concerned in a non-limitative sense, with an application of the invention to a hydro-kinetic torque converter with an axis A. A torque converter of this kind (see FIG. 1) comprises an impeller wheel 10, a turbine wheel 11 and a reactor wheel 12 which define a toric oil chamber 13 which is traversed by a circulation of oil under the action of a pump 14 having an axis A.

For driving the pump 14, a sleeve 15 of axis A is provided fixed on the impeller wheel 10 and has two diametrically-opposite projecting tenons 16. The tenons 16 are parallel to the axis A and extend substantially in the prolongation of the wall of the sleeve 15. The tenons 16 are engaged in slots 17 of a rotor 18 of the pump 14.

As shown in FIGS. 1 to 4, each tenon 16 is formed by a member separate from the sleeve 15, and is held fixed to this latter by jointing means comprising on the one hand a recess 19 which is formed in the sleeve 15 and in which the tenon 16 is inserted with the application of bearing surfaces 20 of the sleeve 15 and bearing surfaces 21 of the tenon 16 in order to retain the tenon 16 axially, and with the application of bearing surfaces 22 of the sleeve 15 and bearing surfaces 23 of the tenon 16 so as to retain the tenon 16 tangentially, and on the other hand a ring 24 concentric with the sleeve 15 and engaged by contact both with the sleeve 15 and the tenon 16 in order to retain the tenon 16 radially.

The tenon 16 is provided with a root portion 26 which is mounted in the recess 19 and a projection portion 28 which is intended to be engaged in the slot 17.

More particularly in the example of FIGS. 1 to 4, the recess 19 is formed on the inside of the sleeve 15 in order to receive the tenon 16 internally, and the ring 24 is also arranged inside the sleeve 15.

In a more detailed manner, the sleeve 15 shown in FIG. 3 comprises an internal annular boss 25 having a groove parallel to the axis A, so as to form the recess 19. The two sides of the boss 25 define the bearing surfaces 20 for axial retention, while the edges of the groove form the tangential retention surfaces 22.

The root 26 of the tenon 16 has a portion 27 of smaller width which is limited by shoulders forming the axial retention bearing surfaces 21. The sides of the portion 27 define the tangential retention surfaces 23.

In order to mount the tenon 16, the root 26 is inserted into the recess 19 with application of the bearing surfaces 20 and 21 and with application to each other of the surfaces 22 and 23. The dimensions and the shape of the recess 19 and of the root 26 are such that the internal surface of the boss 25 is continually cylindrical when once the tenons 16 are put in position in the recesses 19. To this end, the tenon 16 has a slightly incurved shape and its thickness is chosen to be equal to the depth of the recess 19.

When the tenons 16 are thus placed in position and retained axially and tangentially in the recesses 19, the ring 24 is engaged in contact with the internal cylindrical surface of the boss 25, which retains the tenons 16 radially.

The ring 24 has not only this function of radial retention of the tenons 16, but also a bearing-sleeve function (see FIG. 1) for the mounting in rotation of the sleeve 15 on a coaxial cylindrical support 30 with an axis A.

In the example shown in FIG. 1, the support 30 is constituted as a fixed tubular element with which co-operates the reactor wheel 12 through the intermediary of a one-way coupling 31.

It will be appreciated that the mounting of the tenons 16 on the sleeve 15 is particularly simple and strong, and enables a low production cost to be obtained. The tenons 16 may be provided of a harder and stronger material than that of the sleeve 15. They may be manufactured by mass production and, due to their small size, they may be conveniently free from burrs.

It will be observed from FIG. 2 that the projecting portion 28 of the tenon 16 is made slightly displaced with respect to the root 26 by means of a corrugation 29 which assists in increasing the mechanical strength of the tenon 16.

Figure 5:
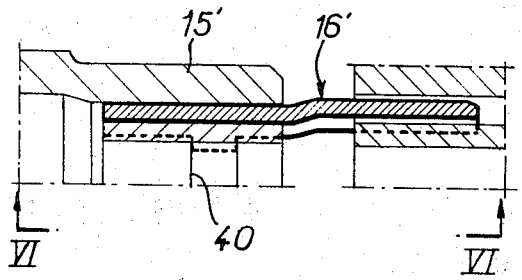
FIG. 5 is a view similar to FIG. 2 but relates to an alternative form of tenon shown in cross-section taken along the line V—V of FIG. 6.
Figure 6:
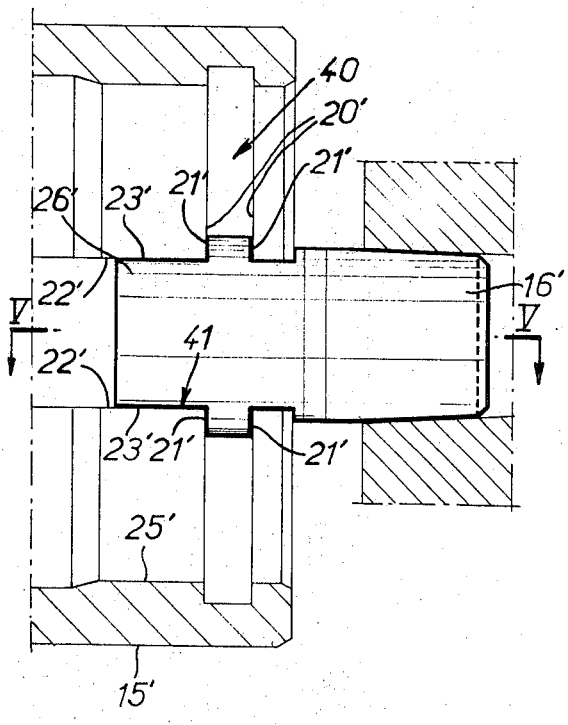
FIG. 6 is a corresponding view in the direction of the arrows VI—VI of FIG. 5, certain parts being removed for the sake of clearness of the drawing.
Figure 7:
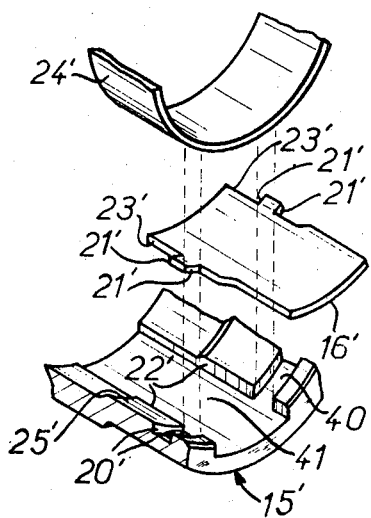
FIG. 7 is a partial exploded view in perspective, illustrating the insertion of the tenon of FIGS. 5 and 6 into the sleeve, and its retention by the ring.

Reference will now be made to FIGS. 5 to 7 in which the arrangement is similar to that which has just been described with reference to FIGS. 1 to 4, but in which the root 26' of the tenon 16' has in this case a cruciform shape with axial retention surfaces 21' engaged in an annular groove 40 of the boss 25' of the sleeve 15', while the sides of this groove 40 form the axial retention surfaces 20'. There can be seen at 25' the tangential retention surfaces of the tenon which co-operate with the tangential retention surfaces 22' constituted by the sides of a groove 41 parallel to the axis A and formed in the boss 25'.

What I claim is:

1. A device for driving two members in rotation, one with respect to the other, in which a first of said members comprises a sleeve having at least one projecting tenon extending substantially in the prolongation of the wall of said sleeve and adapted to co-operate with the second said member, and in which said device is constituted as a member separate from the sleeve and fixed rigidly on said sleeve by engagement means comprising, on the one hand at least one recess formed in said sleeve, said tenon being inserted in said recess with the application against each other of bearing surfaces adapted to retain said tenon axially and tangentially, and on the other hand a ring concentric with said sleeve and engaged in contact both with said sleeve and said tenon, in order to retain said tenon radially.

2. A device as claimed in claim 1, in which said tenon is disposed in the interior of said sleeve.

3. A device as claimed in claim 1, in which said radial retention ring for said tenon forms at the same time a bearing bush which serves for mounting said first member on a coaxial support.

4. A device as claimed in claim 1, in which the extremity of said sleeve is provided with an annular boss having a groove parallel to the axis forming said recess, while the tenon has a portion of reduced width which is engaged in said groove and which is limited by shoulders applied against the two sides of said boss.

5. A device as claimed in claim 1, in which the extremity of said sleeve is provided with an annular boss having an annular slot and a groove parallel to the axis, the whole of which forms the said recess, and said tenon has a cruciform shape adapted to be engaged both in said slot and in said groove.

6. A device as claimed in claim 1, in which said tenon is made from a different material than said sleeve and this material is in particular harder than that of said sleeve.

7. A device as claimed in claim 1, in which said sleeve is provided with a plurality of tenons.

8. A device as claimed in claim 7, in which said sleeve is provided wiht two diametrically-opposite tenons.

9. A device as claimed in claim 1, in which the projecting protion of said tenon is slightly displaced with respect to the root of said tenon by means of a corrugation.

10. A device as claimed in claim 1, in combination with a hydro-kinetic torque converter, in which said sleeve is fixed on an impeller wheel of said converter and said tenon is engaged in a slot in the rotor of an oil-circulation pump, while the radial retention ring of said tenon forms a bearing bush for mounting said sleeve on a fixed coaxial support, said support being associated with a reactor wheel of said converter through a one-way coupling device.

* * * * *